July 7, 1964 C. B. REYNOLDS ETAL Re. 25,615

METHOD OF ADDING A CASING TO A REFRACTORY ARTICLE

Original Filed Nov. 15, 1957 3 Sheets-Sheet 1

INVENTORS
Charles B. Reynolds
Donald C. Burklo
Walter M. Eklund

BY James E. Toomey
Attorney

July 7, 1964 C. B. REYNOLDS ETAL Re. 25,615

METHOD OF ADDING A CASING TO A REFRACTORY ARTICLE

Original Filed Nov. 15, 1957

3 Sheets-Sheet 2

INVENTORS
Charles B. Reynolds
Donald C. Burklo
Walter M. Eklund

BY James E. Toomey
Attorney

METHOD OF ADDING A CASING TO A REFRACTORY ARTICLE

Original Filed Nov. 15, 1957 3 Sheets-Sheet 3

INVENTORS
Charles B. Reynolds
Donald C. Burklo
Walter M. Eklund
BY James E. Toomey
Attorney United States Patent Office Re. 25,615
Reissued July 7, 1964

25,615
METHOD OF ADDING A CASING TO A REFRACTORY ARTICLE

Charles B. Reynolds, Saratoga, Calif., and Walter M. Eklund and Donald C. Burklo, Columbiana, Ohio, assignors to Kaiser Aluminum & Chemical Corporation, Oakland, Calif., a corporation of Delaware Original No. 3,083,453, dated Apr. 2, 1963, Ser. No. 696,771, Nov. 15, 1957. Application for reissue May 27, 1963, Ser. No. 284,290
17 Claims. (Cl. 29—470.7)

Matter enclosed in heavy brackets [ ] appears in the original patent but forms no part of this reissue specification; matter printed in italics indicates the additions made by reissue.

This invention relates to a method for plating a preformed refractory brick or block whereby the metal plate is firmly attached to the refractory to withstand subsequent handling.

Metal-encased refractory articles have long been known in the construction of industrial furnaces; and many methods have been proposed and used for making these articles. However, it has been a difficulty of the prior art that the refractory brick or block has not been safely held by the metal cases, and sometimes the brick fall out of the cases during handling and especially during installation in furnaces, so that the bricks themselves may be broken or often cause serious injury to the workers. Another disadvantage of the prior art has been that in some methods of proceeding the case could only be applied as the refractory article was being formed and was not therefore applicable to a burned brick.

It is an object of the present invention to provide a metal-cased refractory article wherein the metal case tightly and securely engages the refractory component. It is a further particular object of the present invention to provide a method of applying a metal casing to a preformed refractory brick, which can be burned or unburned, in a manner to insure secure adhesion of the casing to the brick during subsequent handling and installation.

According to this invention, there is provided a unitary refractory article comprising a refractory block and a metal casing disposed about the block, the casing comprising a plate of metal which is locally deformed to fit into and conform with shallow, discontinuous depressions of the longitudinal face of the refractory object and securely and tightly engages such refractory. Preferably, the casing is of iron or steel for most industrial uses, but, if desired, other metal plates can be employed, for example, nickel or aluminum plate is sometimes useful. The refractory block is provided with one or more shallow discontinuous depressions in a side face thereof, and the metal plate is placed on the block and is then deformed to fit into and conform with such depressions.

The invention and its mode of operation are further illustrated by the accompanying drawings, wherein.

Figure 1:
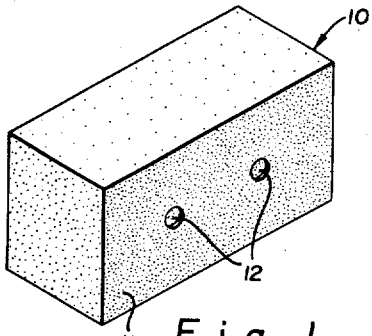
FIGURE 1 is a perspective view of a refractory block having preformed depressions therein useful in making up the article according to the present invention.

According to the present invention, a refractory block, preferably a nonacid or basic refractory, is preformed to the desired shape, and there is provided in such block during formation at least one shallow, discontinuous depression. Alternatively, the block or brick is formed, for example in a brick press or in any desired manner, and after hardening, the desired shallow discontinuous depression or depressions are formed therein by drilling with a suitable drill. For instance, such depressions are formed by drilling with a hard drill, such as a tungsten carbide drill about one inch in diameter. Preferably, two or more such depressions are provided in one longitudinal face, and, if desired, one or more or preferably two or more such shallow depressions are provided in two longitudinal faces; and in this type of structure the shallow depressions are preferably in opposed faces.

It has been found, according to the invention, that it is possible to key a plate onto a refractory brick using a shallow depression and thereby to obtain firm adhesion of the plate to the brick during subsequent handling. The depressions are discontinuous and shallow in order to maintain the strength of the brick, and it has been found likewise that these discontinuous depressions enable keying of the plate to the brick in such a manner that the plate does not slip or slide or change positions with respect to the refractory block which it coats or contains. In general, these depressions do not exceed about 1/16 inch in depth, and preferably are from about ½ to one inch in diameter. The depressions can be of any desired configuration, such as circular, square, V-shaped, diamond-shaped, hemispherical and the like.

The metal plate which is applied is preferably a U-shaped plate and is made of any desired metal. The web of the U-shaped metal plate or channel fits over one longitudinal face of the brick, and the arms of the plate extend over two adjacent side faces of the brick. In many embodiments there may be employed two U-shaped casings, the side arms of which will extend over approximately one-half a longitudinal face of the brick, as illustrated for instance in FIGURE 6. However, in some instances it is more convenient to plate the brick on three sides, and in such embodiment the side arms of the U-shaped plate may extend over substantially the entire adjacent side faces of the brick. The depressions can be placed toward the central areas of the side face, but it is usually preferred to place them at approximately the edges of the side arms of the plate. Other than U-shaped cases are employed, if desired.

The invention is applicable in making metal plated single refractory blocks, and it can also be employed in making hanger units which are composed of two refractory blocks placed side by side so as to form a common hanger receiving socket, as will be further described below. In still another mode of operation a U-shaped plate or a pair of U-shaped plates are applied to one-half only of a refractory block, whereby the remaining half, lengthwise, of the block remains unplated; and in such embodiments when these blocks are placed in juxtaposition in a furnace wall, the metal plate of the one will complement the metal plate of the next one, thereby providing only one thickness of metal between adjacent blocks in a wall.

Figure 4:
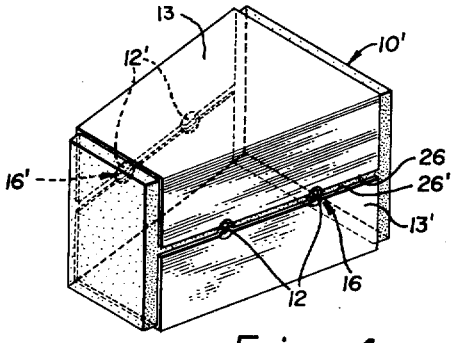
FIGURE 4 is a perspective view of another article made according to the present invention, including two U-shaped plates.

The refractory block component is a formed shape composed of nonacid, that is neutral or basic, refractory material. It is, for example, made of deadburned magnesite, alumina, periclase, chromite, magnesia-chrome or chrome-magnesia mixes or of any other desired neutral or basic refractories; and the mixes are made up, bonded and formed into shape in the manner known to the art. If desired, the formed shapes are burned, baked or fired prior to application of the metal encasement; but, alternatively, the metal casing can be applied to the unburned or chemically bonded shapes. As stated above, during formation the shapes are provided with the desired number of shallow, discontinuous depressions in one or more longitudinal or side faces thereof, or, alternatively, the depressions as desired are drilled into the formed brick. The ordinary "straight" brick or rectangular parallelepiped is shown, for instance, in most of the figures, but a wedge or key form well known in this art can alternatively be employed as shown in FIG. 4. Also, a composite article is made up according to one embodiment, comprising two refractory blocks, disposed on end and side by side and encased in a pair of U-shaped casings keyed to the brick according to the invention by deformation of the metal plate into the shallow, discontinuous depression in the side face of at least one of the bricks; and, if desired, a metal spacer or divider plate is disposed between facing surfaces of the two blocks. This spacer or divider plate is made of any desired material, but most usually iron or steel is employed.

According to one mode of operating the method of the present invention, a basic or neutral refractory block is prepared with one or more shallow depressions in one or more of the side faces of the block, as desired. The U-shaped casing is placed on the block in such manner that the web engages one longitudinal face, and the side arms extend over adjacent longitudinal faces of the brick or block, and the edges of the side arms extend over or lie directly above the depressions in the block. Pressure is now applied to the edges or edge of the side arms to force the metal into conformity with the depression in the block, and the case is thus keyed to the block in a safe and secure manner. It is preferable that an edge of a side arm overlie two such depressions and be depressed into conformity with the depressions in order to obtain more secure affixation of the plate to the block, with less tendency of the plate to be moved or skewed about with reference to the block.

In another mode of carrying out the process of this invention, a brick is provided with the shallow depressions as described above, and a U-shaped metal plate is placed on the block in such manner that the web engages one longitudinal side face and the side arms extend over and in contact with two adjacent side faces of the block. Preferably, two shallow depressions underlie at least one of the side arms of the metal plate. The metal plate is now heated directly above the shallow depressions and is pressed and deformed into conformity with the brick while being heated. The heating step increases the plasticity of the metal and facilitates its deformation into the depression. After the metal has been depressed into conformity with the depression in the brick, heating is continued for a short time to relieve stresses in the metal. It is an advantage of this mode of operation that a thicker metal can be employed and can be depressed with greater ease into the depressions, with less chance of damage to the metal and to the brick. Furthermore, it enables depressing metal into the shallow depressions at any desired part of the metal case, whereas when the metal is deformed into the depressions in the cold and without heating, it is preferred to do so at the edges of the U-shaped arms.

In a particular advantageous mode of operation a brick is provided with the preformed shallow depressions as previously described, that is with one or more, preferably two, depressions in one or more side faces. A small metal piece, such as a metal button of any desired shape which fits into the depression, is placed therein and then two U-shaped plates are placed on the brick in such manner that the edges of the side arms are disposed above, or approximately abut over, the metal buttons or pieces disposed within the recesses. Suitably, the metal button is a piece of metal, such as iron, steel, nickel or other desired metal, of a shape slightly smaller than but conforming to the shape of the depression and wholly contained within the depression when placed therein. If desired, the metal button or piece is held within the recess by a small amount of an adhesive such as a rubbery adhesive, or a glue. After the U-shaped cases are so placed that the edges of the side arms are disposed above the metal piece, welding heat is applied in such manner as to weld the cases together by means of the metal button, and since the metal button is disposed within the brick recess, it anchors the cases to the brick very firmly and insures continued tight engagement between the case and the brick. Very good results are obtained according to this mode of operation by providing a brick having two shallow recesses in one side face, placing a metal button in each such shallow depression, placing the two U-shaped cases on the brick whereby the edges of two side arms are disposed over the shallow depressions and metal pieces, and welding the cases together through the metal button, the shallow depressions being disposed in a line substantially parallel with the longitudinal access of the brick. If desired, however, one or more such shallow depressions can be disposed in opposing side faces of the brick, whereby they underlie both pairs of edges of the side arms of the U-shaped cases. In still another method of operating according to this embodiment, the edges of the side arms can be depressed into the preformed shallow depressions in the brick, a small piece of metal laid into the depression in the metal case and heat, for example, welding heat, is then applied, whereby the metal becomes plastic and flows or is deformed into the shallow depression, filling it and keying the case securely to the brick. Alternatively, two or more L-shaped cases can be applied to the brick and affixed thereto in this manner, welding by means of metal buttons placed within the shallow depressions.

The invention will now be described with particular reference to the accompanying drawings.

FIGURE 1 shows a masonry unit which is a magnesia refractory brick 10 having a side face 11 in which are disposed two shallow depressions 12, which is suitable for encasement according to the present invention.

Figure 2:
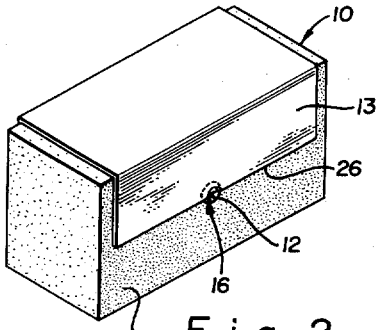
FIGURE 2 is a perspective view of one embodiment of this invention showing one shallow depression in one longitudinal side and a case applied thereover.

FIGURE 2 shows a basic refractory brick 10 which is provided with a shallow depression 12 in side face 11 thereof, and having U-shaped metal casing disposed over one side face and extending about half-way over each of the two adjacent side faces of the brick, the edge 26 of casing 13 passing over depression 12, and being depressed therein and into conformity with the depression as at 16.

Figure 3:
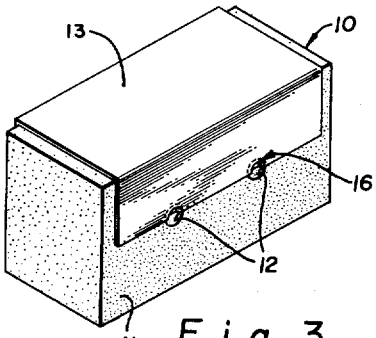
FIGURE 3 is a perspective view of a plated article according to the present invention comprising the refractory block and a U-shaped case.

FIGURE 3 is another embodiment of the present invention in which 10 is likewise a basic brick provided with a U-shaped casing 13 covering substantially half of the entire area of the side faces of the brick. In this embodiment there are provided two shallow depressions 12 in one side face of the brick, and the edge of casing 13 is depressed into depressions 12 as at 16, and in substantial conformity with the shape of one-half of such depression which underlies the edge of case 13. This is a particularly advantageous embodiment in that the provision of two depressions in one side face of the brick assists in preventing any twisting with respect to the brick during subsequent handling.

IN FIGURE 4 is shown a brick 10' which is likewise a basic brick but is of wedge shape. Brick 10' carries two U-shaped casings 13 and 13', the edges of which 26 and 26' lie adjacent each other and over shallow depressions 12 in brick 10'. Shallow depressions 12' of which there are likewise two in number, are disposed on the opposing side face of brick 10' and the opposing edges of cases 13 and 13' lie adjacent each other over depressions 12'. According to the present method, the casings 13 and 13' are depressed as at 16 and 16' into conformity with the shallow depressions 12 and 12' in brick 10' and serve to key the casings to the brick and in secure attachment thereto.

Figure 5:
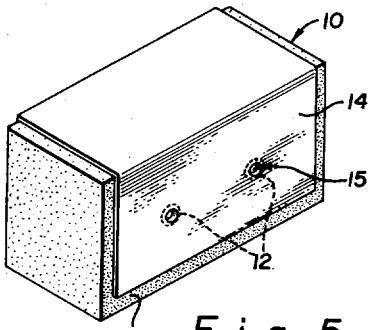
FIGURE 5 is a perspective view of another embodiment of the present invention, comprising a refractory block and a U-shaped plate whereof the side arms cover at least a major portion of a side of the block.

FIGURE 5 shows another embodiment of the present invention in which it is particularly advantageous to deform the metal into conformity with the shallow depression in the brick with the use of heat. Basic brick 10 is provided with U-shaped casing 14 of which the side arms are long enough to substantially cover the entire side 11 of brick 10. Shallow depressions 12 have been previously provided in the side face 11 by drilling with a tungsten carbide drill, and heat and pressure are applied to the metal casing in order to deform the casing at 15 into conformity with the shallow depressions 12, the heating being continued to relieve stresses in the metal. Heat, to deform the metal, can be applied in this manner in a simple fashion with the use of spot welding machine having water-cooled copper electrodes about ¾ inch in diameter, maintaining the temperature below that which welding would occur.

Figure 6:
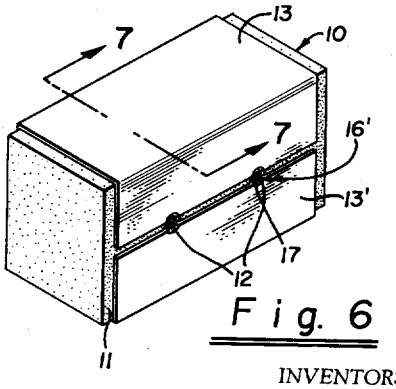
FIGURE 6 is a perspective view of still another and particularly advantageous embodiment of the present invention.
Figure 7:
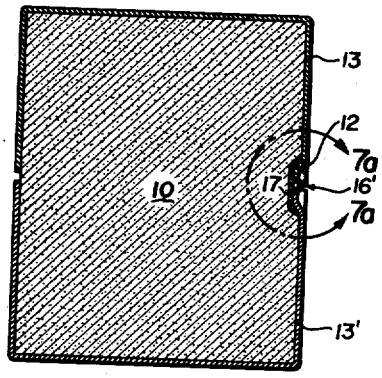
FIGURE 7 is a sectional view on the line 7, 7 of FIGURE 6.
Figure 7A:
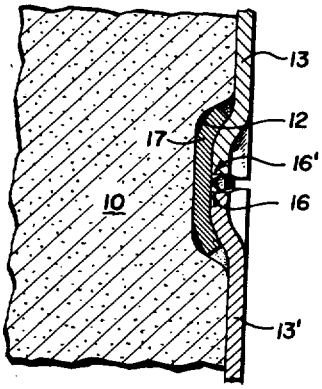
FIGURE 7a is a detailed view of the use of the metal button as shown in FIGURE 7.

In FIGURES 6, 7 and 7*a* there are shown views of a particularly advantageous method of encasing bricks as described herein. As an example, basic brick 10 is provided with shallow hemispherical depressions 12, preferably two on one side face of the brick as shown in FIGURE 6, and about ¾ inch in diameter, and preferably disposed at about the central axis of side face 11 and parallel to a longitudinal axis of the brick. Metal pieces or buttons 17 which are suitably smaller than depressions 12, but the diameters of which are greater than half the diameter of depression 12 so that they will underlie both edges of the U-shaped casings to be applied, are placed in depressions 12. If the brick is lying on its side so that depressions 12 are in the upper face, no precautions are needed to maintain buttons 17 in place, but, alternatively they can be affixed in the depressions by a small amount of a suitable adhesive and then forwarded to the casing station. Casings 13 and 13', of the ordinary U-shaped type, are then placed on brick 10 so that their edges overlie buttons 17. Welding heat is then applied and the case edges are depressed and are welded together through buttons 17. This embodiment is shown in cross-section in FIG. 7 which is taken on line 7, 7' of FIG. 6 and shows in greater detail the disposition of the various elements. FIG. 7a is a detail showing the button 17 in a depression 12 of brick 10, and the overlying edges of cases 13 and 13' which are welded together as at 16', and are slightly depressed into the depression during the welding operation. In any event, the provision of the button insures keying of the casing to the brick and insures that the casing will remain firmly attached to the brick during subsequent handling and installation, while at the same time the brick is not weakened by a continuous groove or by a deep insertion into the refractory material itself.

Figure 8:
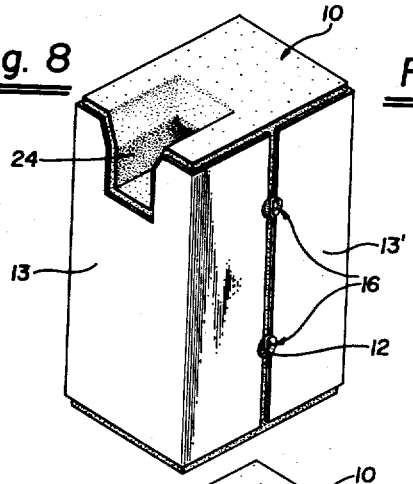
FIGURE 8 is a perspective view of a hanger unit made according to the present invention.
Figure 9:
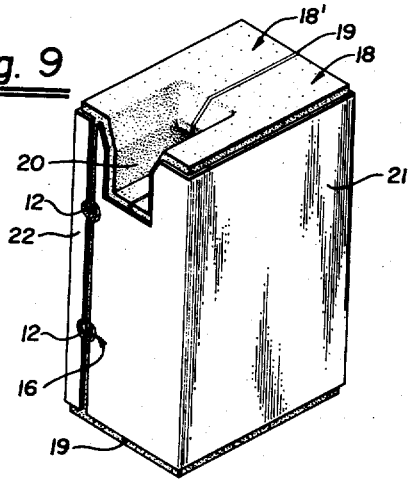
FIGURE 9 is a perspective view of a hanger masonry unit composed of two blocks and metal plated-according to the present invention.

As shown in FIGS. 8 and 9, the invention is also applicable in applying cases to hanger units for use in refractory furnace roofs or furnace roofs to be operated at high temperatures. In FIG. 8 a basic refractory brick 10 is provided with a hanger-receiving or support means-receiving socket generally indicated at 24, and is also provided with two U-shaped cases 13 and 13', the edges of which overlie shallow depressions 12 in brick 10 and are deformed into conformity therewith as indicated at 16. FIG. 9 shows a hanger unit comprising two refractory blocks 18 and 18' which are provided with recesses which form a common hanger-receiving socket, generally indicated at 20, in the manner known to this art. A metal plate 19 is disposed between the adjoining faces of blocks 18 and 18'. Two U-shaped casings 21 and 22 are placed over the combined unit and their edges are disposed over shallow depressions 12 provided in block 18' The edges of casings 21 and 22 are, according to the present invention, then depressed, into shallow depressions 12 as indicated at 16, and serve to key the casing to the brick and to insure its firm adherence thereto during subsequent handling and installation. It will be understood that to secure greater adherence of the casings to the blocks, metal buttons can be placed in depressions 12 and welding heat applied in the same manner as described with reference to FIGURE 6.

Figure 10:
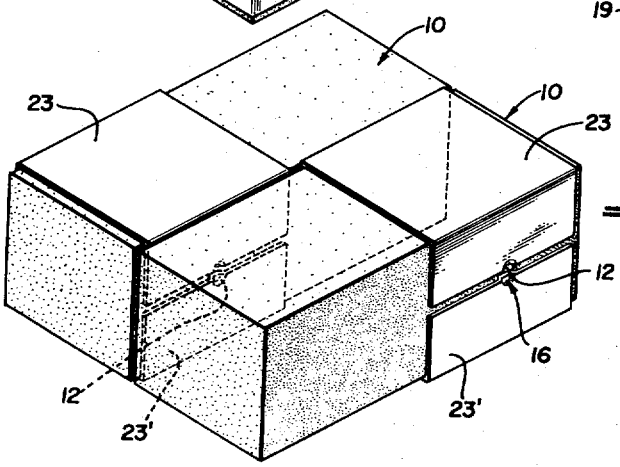
FIGURE 10 is a perspective view of a pair of blocks showing a still further embodiment of the present invention.

FIGURE 10 shows still another embodiment in which U-shaped cases 23 and 23' are so applied to a brick 10 as to cover substantially one-half of the side faces thereof. The metal cases in this embodiment are also depressed as at 16 into conformity with a preformed shallow depression 12 in brick 10 and are thereby keyed to brick 10. In this embodiment one-half of each brick 10 is metal plated or coated in this manner and when installed in a furnace, they are so juxtaposed as shown in FIG. 10 that a single layer of metal lies between each pair of bricks.

Figure 11:
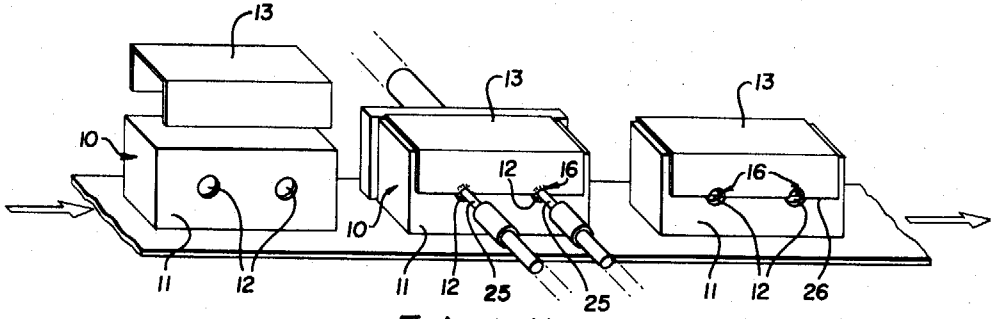
FIGURE 11 is a schematic arrangement for carrying out the process of the present invention.

FIGURE 11 shows in a schematic form an arrangement for encasing bricks according to the present invention. Basic brick 10 is placed on a suitable conveyor with its side face 11 bearing two shallow depressions 12, and case 13 is placed on brick 10 so that its edge 26 overlies depressions 12. The brick and casing then pass to the pressing station where hydraulic or air pressure is applied by means of rams 25 to deform the casing as at 16 into conformity with the shape of about one-half of depression 12. Where the case is to be heat deformed, there can be employed the spot-welding device with copper, water-cooled electrodes described above, or ram devices can be employed which are heated, e.g. by electrical resistance, and which can be operated by air, steam or hydraulic pressure. When metal is to be deformed into the depression, it is frequently advantageous to apply heat in order to effect such deformation of metal more rapidly and with less strain to the metal. In the arrangement of FIG. 11, if a second U-shaped casing is to be applied, the brick is turned over, another casing applied to the uncoated side and the brick and casing forwarded to the depressing station as previously described.

Figure 12:
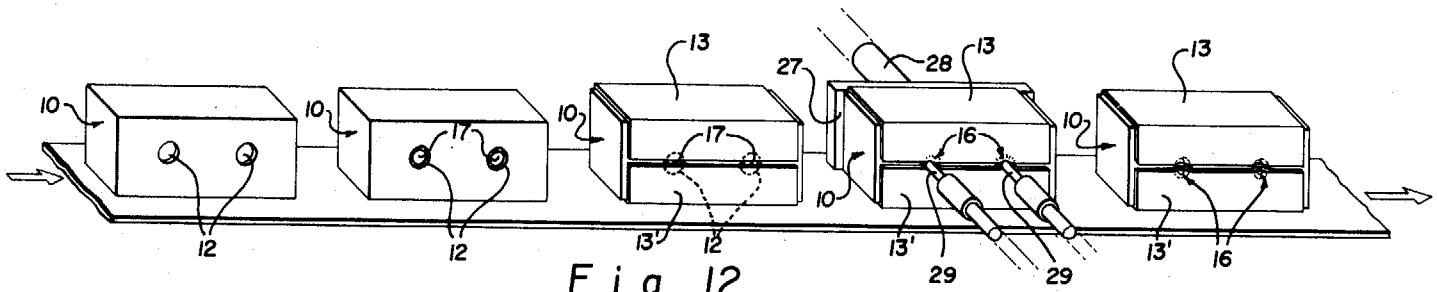
FIGURE 12 shows schematically another arrangement for carrying out a specific embodiment of the present invention.

FIGURE 12 shows schematically an arrangement for encasing brick according to the present invention when a metal button is employed. In this arrangement there is provided a basic refractory brick 10 having depressions 12 in one side face thereof and in the next stage as the brick moves along a conveyor belt of any suitable construction, metal buttons 17 are placed in depressions 12, suitably with the use of a small amount of adhesive (not shown). Then metal casings, of the ordinary U-shape as at 13 and 13', are placed on brick 10 in such manner that their edges lie adjacent each other and are disposed over the metal buttons 17. The bricks and casings then go to the welding station where two resistant welding electrodes are disposed at the same distance apart as depressions 12. The brick 10 and casings 13 are held firmly by a backing block 27 which may be maintained under pressure hydraulically or otherwise as indicated schematically at 28. The welding devices 29 are then moved into contact with the edges of the metal casings 13 and 13' and metal buttons 17 and welding heat is applied to weld the casings together while the metal of the button 17 melts, joining cases 13 and 13', and after solidification, keying the cases securely to brick 10. The edges of cases 13 and 13' will also be slightly depressed into shallow depressions 12 under the influence of the heat and pressure of the welding devices. It will be understood that, if desired, casings 13 can be held firmly against the brick during the depressing and/or welding operations illustrated in FIGURES 11 and 12, by a top pressure block (not shown).

It is an advantage of the present invention that metal casings can be applied to many shapes of brick with secure affixation to the brick so that the casings do not fall off during subsequent handling and installation, thereby preventing both breakage of the brick and injuries to workmen. It is a specific advantage that the brick is not weakened because metal does not extend deeply into the brick. The shallow depressions, which are preferably from about ½ to one inch in diameter, are found to be of sufficient extent that when metal is pressed down into conformity with these depressions the casing is effectively prevented from springing away from the brick or from moving or slipping about on the brick, and, furthermore, the depressions assist in handling the brick by giving convenient thumb or finger holds to the workmen. It is a further advantage of the present invention that casings can be more securely affixed to a preformed brick which can be either burned or chemically bonded, that is, not burned. In applying metal cases to preformed bricks in the past, it has been proposed to punch a small portion of the metal into the brick so that a tang of metal extends downwardly into the brick material and securely affixes the case to the brick. However, this often results in zones of weakness or even hairline cracks which develop into larger cracks upon heating in the furnace and result in spalling or excessive breakage of the brick; and it is a special advantage of the present process that the shallow depressions are preformed or drilled into the brick without production of such zones of weakness or cracks, and the metal which is deformed into such depressions exerts sufficient frictional force to maintain the brick and the casing in secure contact. By means of deformation into the depressions which are shallow and discontinuous, the casing is prevented from moving substantially in any direction.

In the above specific description, where heat has been applied to the casing, the use of welding devices therefor has been described, but it will be understood that, alternatively, there can be employed other localized heating, for example, by an oxy-acetylene flame or by other desired means. Also, such heating elements, with added pressure means if necessary, can be disposed at both sides of the brick if desired to depress metal into the brick on both faces and into one or preferably two preformed depressions, as described, in the brick. In heating to effect deformation or depression of the metal, it has been found suitable in practice to heat to cherry red when working with steel plate, but a suitable degree of heat can be readily selected by the operator. The after-heating to temper, or "post-heating," is effected in the manner well known in the welding art, i.e. at somewhat less temperature than the deforming heating and for a short time. The preformed depression can be formed in the brick at the time of pressing, and this is an expeditious and economical procedure in general. However, the depressions can also be preformed by drilling or grinding a hole of the desired size in the brick after formation, as described above, after which the metal casing is applied as described herein. The casing affixed to a refractory brick or block according to the present invention extends over at least two surfaces of such brick and is preferably a U-shaped, or channel, casing. The adhesive, which is employed if desired to hold the metal button in place during forwarding to the welding station, is preferably a combustible adhesive such as a sticky, rubbery adhesive of the type of rubber latex, artificial rubber latex, vinyl resin latex or the like, which burns upon heating or firing to form essentially carbon dioxide and water and therefore does not, upon installation and use in a furnace, deleteriously affect the strength or other characteristics of the refractory component, even locally. It will be understood that adhesive can also be applied between the brick and casing if desired.

Having now described the invention, what is claimed is:

1. The method of applying a metal casing to a nonacid refractory brick which comprises forming in said brick at least one shallow discontinuous depression in a longitudinal face, placing on said brick a U-shaped metal casing composed of a web and two arms, said casing being disposed over three longitudinal faces of said brick such that one of said arms is disposed above said depression, applying heat to said casing above said shallow depression, and pressing and locally deforming said metal casing into said shallow depression while heating.

2. Method of applying a metal casing to a basic refractory brick which comprises pressing said brick with at least one shallow discontinuous depression in at least one side face of said brick, placing on said brick a U-shaped casing, the web covering a major portion of one side face of said brick and arms extending over adjacent side faces, one arm lying above said shallow depression, heating said metal above said shallow depression and pressing and locally deforming the heated metal into conformity with said depression.

3. Method of applying a metal casing to a basic refractory brick which comprises providing said brick with at least two shallow discontinuous depressions in one longitudinal face thereof, placing on said brick a U-shaped casing, the web covering a major portion of one side face of said brick and arms extending over adjacent side faces, one arm lying above said shallow depressions, heating said metal above said shallow depressions and pressing and locally deforming said heated metal into conformity with said depressions.

4. Method as in claim 3 wherein said metal after depressing is heated to temper and relieve stresses.

5. Method of applying a metal casing to a basic refractory brick which comprises providing said brick with two shallow discontinuous depressions in a longitudinal face thereof, said shallow depressions being disposed in a line parallel with a longitudinal edge of said brick, placing on said brick two U-shaped casings, said U-shaped casings having edges abutting above said shallow depressions, heating said metal above said shallow depressions and pressing and locally deforming said heated metal into conformity with said depressions, and continuing to heat said metal to temper and relieve stresses.

6. Method of applying a metal casing to a basic refractory brick which comprises providing said brick with at least one shallow discontinuous depression in a longitudinal face thereof, placing two U-shaped casings on said brick in opposed relationship and such that the edges of opposed arms of said U-shaped casings are disposed adjacent each other above said shallow depression, placing a metal button in contact with the edges of said two U-shaped casings above said depression, and applying pressure and welding heat to weld said cases and said button and depress metal into said shallow depressions.

7. Method of applying a metal casing to a basic refractory brick which comprises providing said brick with at least one shallow discontinuous depression in a longitudinal face thereof during formation of said brick, placing a metal button in said depression, placing on said brick two U-shaped casings in opposed relationship and such that the edges of opposed arms of said U-shaped casings are disposed adjacent each other in a common plane above said shallow depression and said button, applying pressure and welding heat to weld said casings to said button and depress said edges into said shallow depression.

8. Method of applying a metal casing to a basic refractory brick which comprises providing said brick with at least one shallow discontinuous depression in a longitudinal face thereof during formation of said brick, placing in said shallow depression a metal button conforming to the shape of said depression and fitting flush with said face of said brick, placing on said brick two U-shaped casings in opposed relationship, such that the edges of opposed arms of said U-shaped casings are disposed adjacent each other in a common plane above said shallow depression and said button, and welding said casings and said button together.

9. Method of applying a metal casing to a basic refractory brick which comprises providing said brick with at least one shallow discontinuous depression in a longitudinal face thereof, adhesively affixing a metal button in said depression, placing two U-shaped casings on said brick in opposed relationship, such that the edges of opposed arms of said U-shaped casings are disposed adjacent each other in a common plane above said shallow depression and button, and welding said casings and button.

10. Method of applying a metal casing to a basic refractory brick which comprises providing said brick with at least one shallow discontinuous depression in a longitudinal face thereof, placing on said brick two U-shaped casings in opposed relationship such that the edges of opposed arms of said U-shaped casings are disposed adjacent each other above said shallow depression, placing a metal button over said casings above said depression, and applying pressure and welding heat to weld said casings together and depress said metal into said depression.

11. Method of applying a metal plating to a nonacid refractory brick which comprises providing said brick with at least one shallow, discontinuous depression in each of two longitudinal sides thereof, placing two ferrous metal U-shaped cases upon said brick in opposed relation, such that opposing edges of the arms of said cases are disposed adjacent each above each of said depressions, placing a ferrous metal button in contact with the edges of said casings above each said depression, welding said cases and said buttons together at each said depression, and pressing and deforming said button and edges into each said depression.

12. Method of applying a metal casing to a nonacid refractory brick which comprises forming in a longitudinal face of said brick during the pressing thereof at least one shallow discontinuous rounded depression, placing two U-shaped casings on said brick in opposed relation such that the edges of opposing arms of said cases are disposed adjacent each other above said depression, heating said metal cases above said depression and pressing and locally deforming said metal into said depression.

13. Method as in claim 12 wherein after depressing metal into said depression, said metal is heated to temper and relieve stresses.

14. Method of applying a metal casing to a nonacid refractory brick which comprises forming in at least one side face of said brick at least one shallow discontinuous depression contained wholly within said face, placing on said brick a U-shaped casing, the web of said casing covering a major portion of one side face of said brick and the arms of said casing extending over adjacent side faces thereof, the edge of at least one said arm lying above said shallow depression, and then applying localized pressure to the area of said edge above said depression and locally deforming said area into conformity and frictional engagement with the surface of said depression.

*15. Method of applying a metal casing to a nonacid refractory brick having a first side face and a pair of adjacent side faces which comprises forming in a central portion of one of said pair of adjacent side faces at least one shallow discontinuous depression of diminutive area compared to the area of said one side face and lying wholly within said central portion thereof, placing on said brick a U-shaped casing, the web of said casing covering a portion of said first side face of said brick and the arms of said casing extending over said pair of adjacent side faces and with one of said arms having a portion lying wholly over said shallow depression, and then applying localized pressure to the portion of said arm overlying said depression and locally deforming said portion of said arm into conformity and frictional engagement with the surface of said depression.*

*16. Method of applying a metal casing to a nonacid refractory brick having a first side face and a pair of adjacent side faces which comprises forming within a central portion between the end edges and substantially midway of the side edges of one of said pair of adjacent side faces at least one shallow discontinuous depression of diminutive area compared to the area of said one side face, placing on said brick a U-shaped casing, the web of said casing covering a portion of said first side face of said brick and the arms of said casing extending over said pair of adjacent side faces and with one of said arms having a portion lying wholly over said shallow depression, and then applying localized pressure to the portion of said arm overlying said depression and locally deforming said portion of said arm into conformity and frictional engagement with the surface of said depression.*

*17. Method of applying a metal casing to a nonacid refractory brick having a first side face and a pair of adjacent side faces which comprises forming within a central portion between the end edges and substantially midway of the side edges of one of said pair of adjacent side faces a pair of shallow discontinuous depressions of diminutive areas compared to the area of said one side face, placing on said brick a U-shaped casing, the web of said casing covering a portion of said first side face of said brick and the arms of said casing extending over said pair of adjacent side faces and with one of said arms having portions lying wholly over said shallow depressions, and then applying localized pressure to the portions of said arm overlying said depressions and locally deforming said portions of said arm into conformity and frictional engagement with the surface of said depression.*

References Cited in the file of this patent or the original patent

UNITED STATES PATENTS

| | | |
|---|---|---|
| 1,250,971 | Converse | Dec. 25, 1917 |
| 1,593,297 | Gilmer | July 20, 1926 |
| 1,700,101 | Smith | Jan. 22, 1929 |
| 2,125,192 | Morlock | July 26, 1938 |
| 2,125,193 | Morlock | July 26, 1938 |
| 2,158,759 | Morlock | May 16, 1939 |
| 2,187,669 | Stewart | Jan. 16, 1940 |
| 2,422,461 | Arquette | June 17, 1947 |
| 2,673,373 | Heuer | Mar. 30, 1954 |
| 2,682,703 | Schob | July 6, 1954 |
| 2,736,187 | Coffman et al. | Feb. 28, 1956 |
| 2,791,116 | Heuer | May 7, 1957 |

FOREIGN PATENTS

| | | |
|---|---|---|
| 567,418 | Great Britain | Feb. 13, 1945 |